March 18, 1969    A. B. FRANCIS    3,433,569
HOLDER AND POSITIONING MECHANISM FOR THE PLATES
OF A MULTIPLE BEAM INTERFEROMETER
Filed Jan. 14, 1966
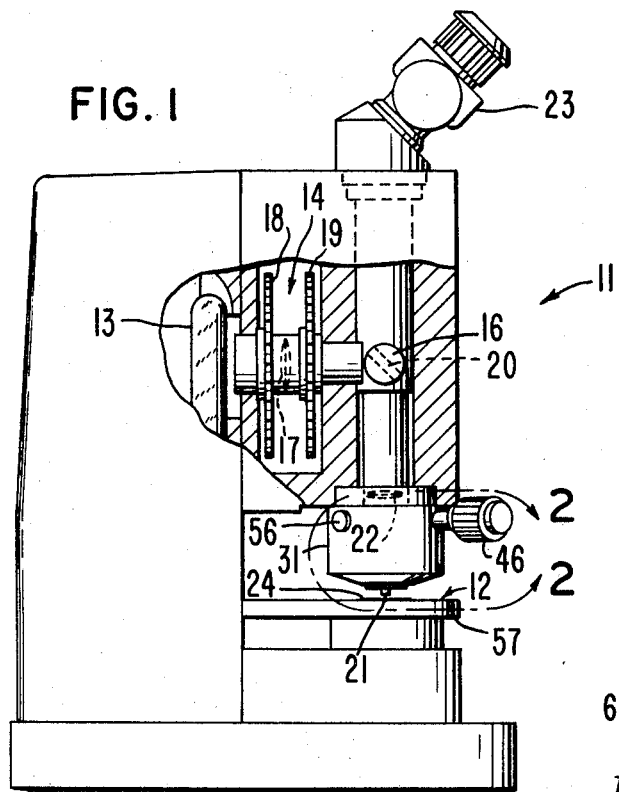
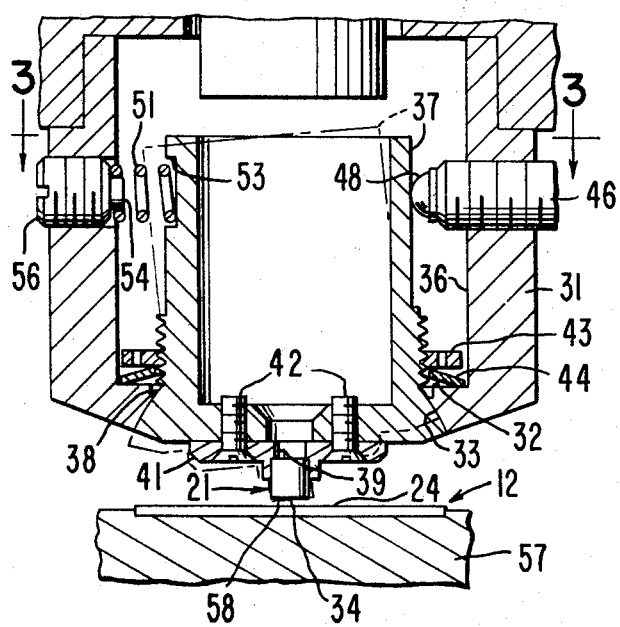
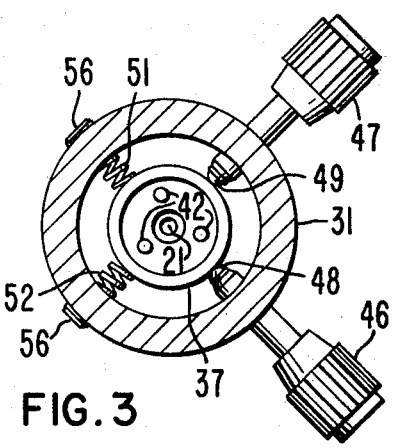
INVENTOR.
ARTHUR B. FRANCIS
BY
ATTORNEY 3,433,569
HOLDER AND POSITIONING MECHANISM FOR THE PLATES OF A MULTIPLE BEAM INTERFEROMETER
Arthur B. Francis, Los Altos Hills, Calif., assignor to Varian Associates, Palto Alto, Calif., a corporation of California
Filed Jan. 14, 1966, Ser. No. 536,240
U.S. Cl. 356—109                7 Claims
Int. Cl. G01b *9/02;* G02b *21/24*

ABSTRACT OF THE DISCLOSURE

The present invention relates to a plate positioning mechanism wherein the air wedge angle between the specimen and an optically flat plate is adjusted by pivoting one of the plates about the centricity of its surface facing the other plate. It comprises a pair of columnar members, one received within the other and having spherically contoured surfaces at their periphery interface whereby the center of curvature of the spherical surfaces coincides with the center of the surface of plate.

---

The present invention relates generally to a positioning mechanism for adjusting the air wedge angle between the specimen and optically flat plates of an interferometer. More particularly it relates to a plate positioning mechanism wherein the air wedge angle between the specimen and optically flat plates is adjusted by pivoting one of the plates about the centricity of its surface facing the other plate.

Multiple beam interferometers are extensively employed to study surface microtopography and to evaluate the thickness of thin films. In either case it is important that the surface under investigation be preserved throughout the period of investigation.

Conventional interferometers generally employ an optically flat plate, generally referred to as a Fizeau plate or interferometer plate, which is fixed in position above a tiltable specimen plate. When in use the specimen plate usually is tilted with respect to the Fizeau plate to define an exceedingly small angle therewith. This angle commonly is referred to as the air wedge angle. Moreover, often times it is necessary to maintain the maximum spacing between the angularly related plates extremely small, e.g., a distance comparable to a few wavelengths of the particular light used in generating the interferogram. Hence it is common practice to position the Fizeau and specimen plates in plane touching parallel relation and to adjust the air wedge angle therebetween by pivoting the specimen plate away from the Fizeau plate with the plates remaining in point contact at the apex of the air wedge angle formed.

Generally, the specimen plates are pivoted about a point lying off the surface thereof facing the Fizeau plate. The pivot point usually is located below the specimen plate with the distance between the pivot point and the surface facing the Fizeau plate lying in the range of ¾ to 1″. As the specimen plate is pivoted, the centricity of the surface facing the Fizeau plate defines an arcuate path which is tangentially intersected by the surface of the Fizeau plate facing the specimen plate. On the other hand, all other points on the specimen plate surface define arcuate paths which cross the Fizeau plate surface. Consequently, as the specimen plate is pivoted to adjust the air wedge angle, the portion of the Fizeau plate, which generally is smaller than the specimen plate, in point contact with the specimen plate is drawn over the surface of the specimen plate. This drawing of the Fizeau plate over the surface of the specimen plate tends to alter materially the specimen being analyzed and also to increase the maintenance frequency for the interferometer. In those cases where the specimen plate is maintained stationary and the Fizeau plate is pivoted to adjust the air wedge angle the same problems set forth hereinabove are encountered.

The present invention is a positioning mechanism for the plates of an interferometer which overcomes those aforementioned disadvantages and limitations. More specifically, in the present plate positioning mechanism one of the plates of the interferometer, preferably the specimen plate, is maintained stationary below a pivotally mounted Fizeau plate. The pivoting mechanism is arranged to adjust the pivotally mounted plate to define with the stationary plate an air wedge angle of less than 90° with the pivot point coinciding with the centricity of the surface of the pivotally mounted plate facing the stationary plate. Although the pivotally mounted plate can be adjusted over a large range, i.e., approaching 90°, in most practical applications of multiple beam interferometers the air wedge angle never exceeds one degree. Because the plate which is adjusted to define the air wedge angle is pivoted about the point on its surface facing the stationary plate very little relative movement between the pivoted and stationary plates is produced during air wedge angle adjustments in comparison to prior art systems. Furthermore, by constructing the pivoted plate to have a very small facing surface, e.g., 0.01 in.$^2$, and limiting the range over which the pivoted plate can be adjusted, e.g., to define air wedge angles of less than 1°, the amount of relative movement between the plates becomes insignificant.

From the foregoing, it is seen that the plates of the interferometer of the present invention can be adjusted without giving rise to specimen damage or rendering the interferometer defective. Hence, a multiple beam interferometer constructed in accordance with the present invention will be characterized by requiring very little maintenance and being able to yield more precise results. These advantages will be realized to varying degrees if the pivot point is located at points on the surface of the adjustable plate facing the stationary plate other than the centricity of the surface. In all these cases the results obtained and the operation of the interferometer will be superior to the prior art devices, especially, of the classes noted supra.

Accordingly, it is an object of the present invention to provide a positioning mechanism for adjusting the air wedge angle between the specimen and Fizeau plates of an interferometer without rendering the interferometer defective or damaging the specimen being analyzed.

One feature of this invention is the provision of a movable plate holder for positioning a plate of an interferometer opposite another plate which is adjustable to pivot the held plate about a point coinciding with its surface facing the opposing plate.

Another feature of this invention is the provision of a movable plate holder of the above featured type wherein the held plate is pivoted about a point coinciding with the centricity of its facing surface.

An additional feature of this invention is a provision of a movable plate holder of the above featured types wherein the held plate is slideably seated in a spherically contoured seat.

Yet another feature of this invention is the provision of a positioning mechanism for the plates of a multiple beam interferometer wherein the sample plate is held stationary and the Fizeau plate is pivotally mounted thereabove to be tilted relative thereto about a point coinciding with the centricity of the surface of the Fizeau plate facing the specimen plate.

Still another feature of this invention is the provision of a holder and positioning mechanism for the plates of a multiple beam interferometer of the above featured types wherein the Fizeau plate is mounted in facing surface touching relation with the specimen plate.

These and other features and objects of the present invention will become apparent upon consideration of the following description taken in connection with the accompanying drawing of which:

FIG. 1 is an illustration of a conventional reflection type multiple beam interferometer adapted to employ one embodiment of the plate positioning system of the present invention.

FIG. 2 is an elevation cross-sectional view of the section of the interferometer delineated by line 2—2 in FIG. 1 and shows one embodiment of the plate positioning system of the present invention.

FIG. 3 is a cross-sectional view of the embodiment of FIG. 2 taken along lines 3—3.

FIG. 4 is a diagramatic illustration of an interferogram produced by a sample having a step type discontinuity in its surface.

Referring to FIG. 1, a multiple beam reflective type interferometer 11 for producing Fizeau fringe patterns which are representative of the contour of the surface of a sample residing on sample plate 12 comprises a monochromatic light source 13, such as a sodium vapor lamp, mounted at right angles to the reflective viewing path. An optical system 14 is arranged to receive and project an image of source 13 at a selected image point 16. Such an optical system 14 will generally comprise a condensing lense 17 mounted between an adjustable field of illumination defining iris 18 and an adjustable field intensity defining iris 19. A half silvered mirror 20 is positioned to receive the light from the optical system 14 and project it towards the Fizeau plate 21 and specimen plate 12 of interferometer 11.

In multiple beam interferometers, a parallel beam of light is employed to form the Fizeau fringe patterns. To generate the required parallel beam of light, an objective lens 22 is mounted so that image point 16 lies at its back focus. The light at image point 16 is rendered parallel by the objective lens 22 to fall on Fizeau plate 21 and specimen plate 12. In reflective type interferometers where the incident and reflected light beams are coextensive, the plates 12 and 21 must be positioned just outside the focal point of the objective lens 22 in order that the image of the fringe pattern is produced at an eye piece 23 located on the side of mirror 20 opposite objective lens 22.

The Fizeau fringe pattern is generated by positioning the plates 12 and 21 to define an air wedge angle therebetween. (See the dotted lines in FIG. 2 showing the Fizeau plate 21 in a tilted position.) The size of the air wedge angle defined by the plates is adjusted in accordance with the size of the surface variations to be encountered. As noted hereinbefore, it has been the practice in the prior art to position the plates 12 and 21 in abutting relation and to adjust the air wedge angle therebetween by tilting specimen plate 12 about a pivot point lying off the surface 24 facing the Fizeau plate 21.

With reference to FIGS. 2 and 3, the mechanism of the present invention for holding and positioning the plates of an interferometer comprises a hollow cylindrical columnar seat member 31 mounted at one end thereof to the interferometer 11 proximate the side of objective lens 22 distal eye piece 23. Member 31 is provided with a shoulder 32 at its periphery having a spherically contoured seating surface 33 whose center of curvature is at a point 34 in the direction towards the plate to be seated thereto; in the figures Fizeau plate 21. As shown in the figures, the end of member 31 distal objective lens 22 is provided with the shoulder 32 about its inner periphery 36 having a spherically contoured seating surface 33 which faces outward from member 31. As will become apparent from the description infra, shoulder 32 could be positioned at any point about or at the inner or outer periphery of hollow member 31. Furthermore, the spherically contoured seating surface 33 could have either a convex inflection or, as shown in the figures, a concave inflection. However, in all these cases, the center of curvature of the seating surface 33 must lie at the point 34 in the direction towards the plate to be seated to member 31.

Mounting of the Fizeau plate 21 is accomplished by a hollow cylindrical columnar carrier 37 disposed coaxially with seat member 31. The carrier 37 has a spherically contoured shoulder 38 at its periphery which mates with seating surface 33 in slideable nested relation. In the embodiment illustrated in the figures, carrier 37 is disposed coaxially within member 31 with spherically contoured shoulder 38 having a convex inflection at the end thereof distal objective lens 22. Carrier 37 also could be disposed coaxially without member 31. Furthermore, the spehircally contoured shoulder 38 could be positioned at any point at or about the inner and outer periphery of carrier 37 to have a convex or concave inflection. In any case, the spherically contoured shoulder 38 must mate with the particular seating surface 33 in slideable nested relation. Hence, the seating surface 33 will have a concave inflection when spherically contoured shoulder 38 has a convex inflection and a convex inflection when shoulder 38 has a concave inflection.

The Fizeau plate 21 is wedged in aperture 39 of a flange 41 which in turn is secured to the shoulder end of carrier 37 by screws 42. Cylindrical carrier 37 is snugly seated to member 31 by a nut 43 and a spring washer 44. Nut 43 threadingly engages carrier 37 to bear against spring washer 44 which in turn rests upon shoulder 32 of member 31. As the nut 43 is advanced towards the shoulder end of carrier 37 carrier 37 is seated in member 31. Carrier 37 is able to be tilted relative to member 31 because of the interposition of washer 44 between nut 43 and shoulder 32 of member 31.

The position of carrier 37 on the seating surface of member 31 is controlled by screws 46 and 47 threadingly mounted to member 31 at locations along orthogonally intersecting axes proximate the end thereof distal Fizeau plate 21. Carrier 37 is held in position by the tips 48 and 49 of each of the screws 44 and 46 and diametrically opposing springs 51 and 52. Each spring 51 and 52 is secured between a recess 53 in carrier 37 and a collar 54 of a spring compression adjustment screw 56 threadingly engaging member 31.

In the particular embodiment illustrated, specimen plate 12 is held in place spaced below Fizeau plate 21 by a specimen plate holder 57. Preferably, holder 57 is spring loaded so that specimen plate 12 can be held against Fizeau plate 21 to move towards and away therefrom as Fizeau plate 21 is tilted or moved towards specimen plate 12. Where the interferometer 11 is employed to analyze planar films, e.g., as in measuring the thickness of thin films, holder 57 will be adapted to fix sample plate 12 in a plane which is parallel to the plane defined by Fizeau plate 21 when it is in its home position. (The home position is shown in FIG. 2 by the solid lines delineating carrier 37.)

The curvature of the spherically contoured seating surface 33 and shoulder 38 and the position of Fizeau plate 21 is adjusted so that the center of curvature point 34 falls on the front surface 58 of the plate being held by member 31, in this embodiment Fizeau plate 21, facing the other plate, or specimen plate 12. In its most preferred embodiment, the radius of curvature of spherically contoured shoulder 38, hence mating seating surface 33, is adjusted so that its center of curvature falls at the centricity of the front surface 58 of Fizeau plate 21.

In operation, screws 46 and 47 are adjusted to pivot carrier 37 about centric point 34 until Fizeau plate 21 is positioned relative to specimen plate 12 to define a selected air wedge angle, for example, as depicted by the dotted lines in FIG. 2 delineating carrier 37. The light from source 13 is rendered parallel and projected to impinge upon the plates 21 and 12. As in conventional interferometers, the impinging parallel light is reflected between the angled plates to generate an interference pattern which is representative of the contour of the surface of specimen plate 12 or the specimen disposed thereon. The reflected image of the interference pattern is projected to eye piece 23 where it is viewed or recorded by suitable light sensitive means.

FIG. 4 portrays an interferogram that would be produced when the specimen on specimen plate 12 has a step running thereon, for example, as encountered where a specimen film is deposited to cover a part of specimen plate 12. The dashed line 61 depicts the terminal end of the specimen film. The thickness in angstroms of the specimen film deposited on specimen plate 12 can be determined by the ratio of $$\frac{B-A}{C-A} \frac{\lambda}{2}$$

where $C-A$ is the distance between successive fringes 62 above line 61, $B-A$ is the distance that the fringes 63 below line 61 have been offset from those fringes 62 above line 61 and $\lambda$ is the wavelength of the monochromatic light from source 13.

While the present invention has been described with respect to a single embodiment, many modifications and variations are possible within the scope of the invention. Most notably, the specimen plate 12 and Fizeau plate 21 could be interchanged. More specifically the Fizeau plate 21 would be secured in position to the interferometer 11 proximate objective lens 22 and the specimen plate 12 mounted by the mechanism described supra with reference to the Fizeau plate 21 to be pivoted about a point lying on its surface facing Fizeau plate 21. Furthermore, if the specimen plate 12 is pivotally mounted it would not be necessary to use channeled columnar members 31 and 37. Instead it would be only necessary that one of the columnar members be channeled to receive the other member therein. In addition, as is well known both a reflected and a transmitted image of the interference pattern is generated at the inner face of the plates 12 and 21. Hence, specimen plate holder 57 could be channeled or constructed of light pervious material to facilitate viewing the transmitted image of the interference pattern. Therefore, the foregoing description is not intended to limit the invention except by the terms of the following claims.

What is claimed is:

1. In a multiple beam interferometer for analyzing surface contours by projecting a beam of light to impinge an optically flat plate and a specimen plate, at least one of said plates being light transmissive, the combination comprising, a first columnar member, a second columnar member supporting one of said plates to face the other plate and to receive said beam of light thereon, means providing a path for said beam of light through said at least one of said plates, at least one of said members defining a channel at least part way therethrough to receive the other member therein, a first shoulder secured to said first columnar member at a periphery thereof, said shoulder having a spherically contoured seating surface whose center of curvature is at a point substantially coinciding with the center of the face of said plate held by said second member facing said other plate, a second shoulder secured to said second columnar member at a periphery thereof, said second shoulder having a spherically contoured surface to mate in slideable nested relation with said spherically contoured seating surface when said first and second members are assembled, and means for positioning and holding said first and second columnar members together.

2. The apparatus according to claim 1 wherein said first and second columnar members each define a channel therethrough for passage of said beam of light.

3. The apparatus according to claim 2 wherein said first shoulder is secured to said first member at the inner periphery thereof defining said channel, said second shoulder is secured to said second member at the outer periphery thereof, and said second member disposed coaxially within said first member.

4. The apparatus according to claim 3 wherein said first shoulder is secured at one end of said first member and defines said spherically contoured seating surface to face outward from said first member, and said second shoulder is secured at the end of said second member proximate said first shoulder and defines said spherically contoured surface to have a convex inflection.

5. The apparatus according to claim 4 wherein said first and second shoulders are annular and secured about their entire respective outer peripheries to their respective members.

6. The apparatus according to claim 5 wherein said holding and positioning means includes a nut threadingly engaging said second member proximate the shouldered end thereof, a spring washer interposed between said nut and said first shoulder, first and second screws threadingly transpiercing said first member at orthogonally intersection axes to engage said second member, and a compression spring means fixed between said first and second members at locations diametrically opposite said first and second screws.

7. The apparatus according to claim 6 wherein said first member is adapted to be secured at the end thereof distal said shoulder to said interferometer to receive said beam of light through said channels of said first and second members, and said second columnar member is provided with a demountable flange optically flat plate holder at its shouldered end.

References Cited

UNITED STATES PATENTS 2,483,897  10/1949  Godfrey _____ 350—82 X
3,028,782   4/1962  Bernhardt et al.

FOREIGN PATENTS 1,342,254   9/1963  France.

JEWELL H. PEDERSEN, *Primary Examiner.*

T. MAJOR, *Assistant Examiner.*

U.S. Cl. X.R.

35—85